April 19, 1966 P. HUSKA 3,246,580
ROTARY FLUID DISPLACEMENT DEVICE
Filed July 8, 1963 2 Sheets-Sheet 1

INVENTOR.
PAUL HUSKA
BY
W. H. Maxwell
AGENT

April 19, 1966 P. HUSKA 3,246,580
ROTARY FLUID DISPLACEMENT DEVICE
Filed July 8, 1963 2 Sheets-Sheet 2
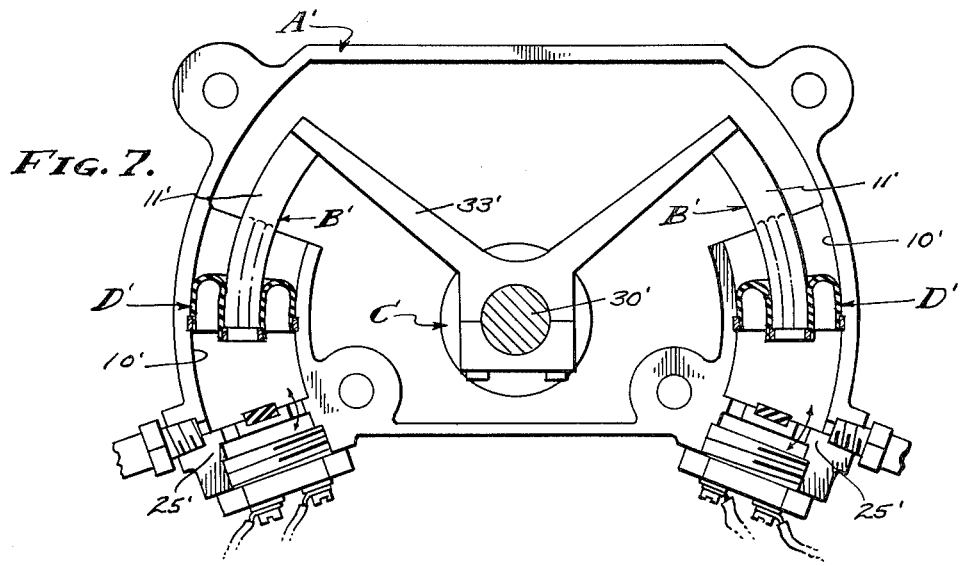
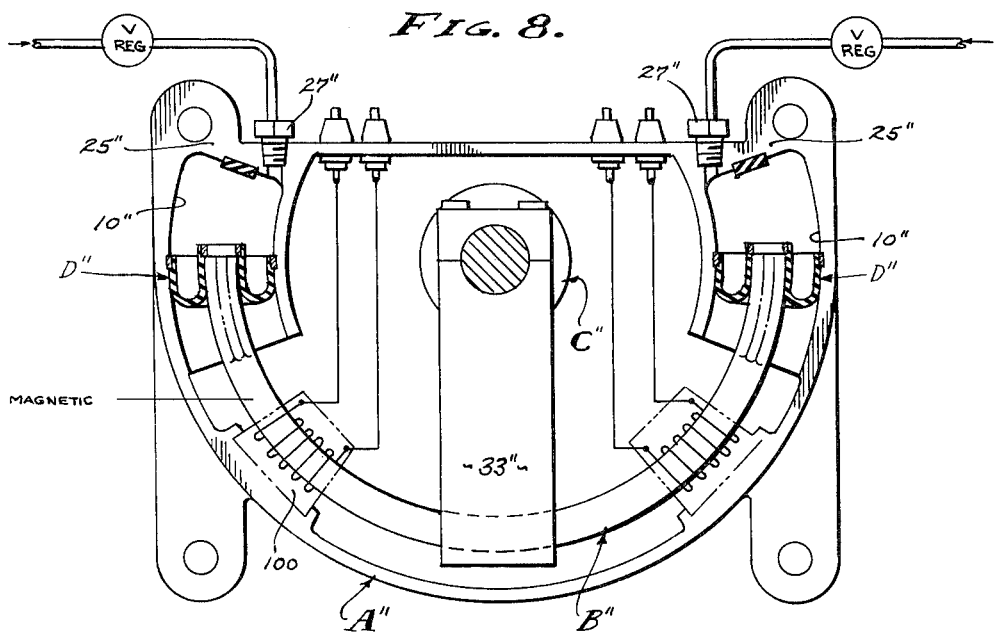
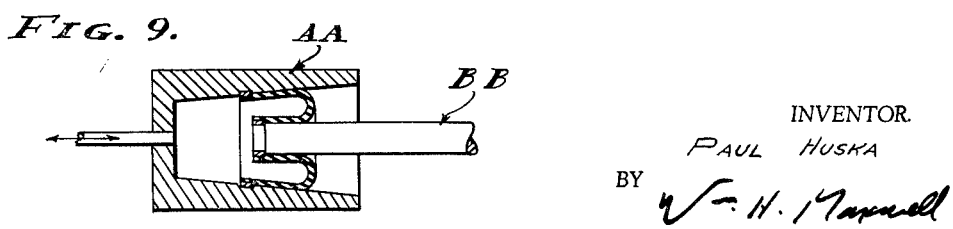
INVENTOR.
PAUL HUSKA
BY
AGENT

United States Patent Office 3,246,580
Patented Apr. 19, 1966

3,246,580
ROTARY FLUID DISPLACEMENT DEVICE
Paul Huska, Los Angeles, Calif.
(1150 18th St., Santa Monica, Calif.)
Filed July 8, 1963, Ser. No. 293,369
2 Claims. (Cl. 92—120)

This invention relates to a fluid handling rotary device wherein fluid displacement and mechanical motion is involved. Particularly, this invention relates to devices such as servos, transducers, and accelerometers, and the like, it being an object of this invention to precisely correlate the displacement of fluid directly with rotary movement.

Heretofore, the displacement of fluid as related to rotary motion has presented serious problems, reference being made to rotary devices which require positive displacement of fluid. The usual rotary devices are burdened with friction between the moving parts and as a result they are not accurately sensitive, nor are they suitable for instrumentation purposes as servos, transducers or accelerometers. On the other hand instrumentation that is suitable is ordinarily operable by the application of rectilinear force and requires considerable adaptation when applied to a rotary mechanism. All in all, no direct approach to correlating rotary motion in a substantially frictionless fluid pressure sensor has been made, and it is an object of this invention to provide a practical device meeting these requirements.

An object of this invention is to provide a substantially friction-free servo wherein there is positive fluid displacement correlated with rotary motion.

Another object of this invention is to provide a friction-free transducer wherein there is positive fluid displacement correlated with rotary motion. The said transducer may be either static or dynamic, in that the sensing or movable element can be substantially fixed or freely movable within limits.

Still another object of this invention is to provide a friction-free accelerometer wherein there is positive fluid displacement precisely correlated directly with rotary motion. The said accelerometer may be either static or dynamic, in that the sensing or movable element can be substantially fixed or free to move within limits.

Also, it is an object of this invention to provide a gland for use as a piston or ram, suitable for the positive displacement of and measurement of fluids.

Figure 1:
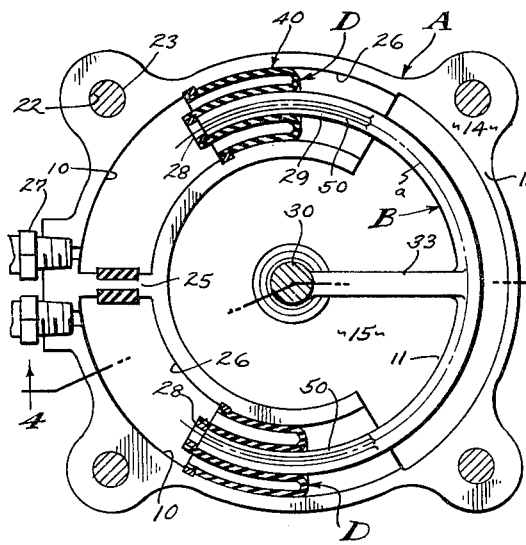
Figure 2:
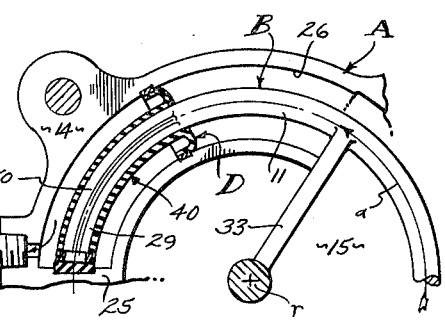
Figure 3:
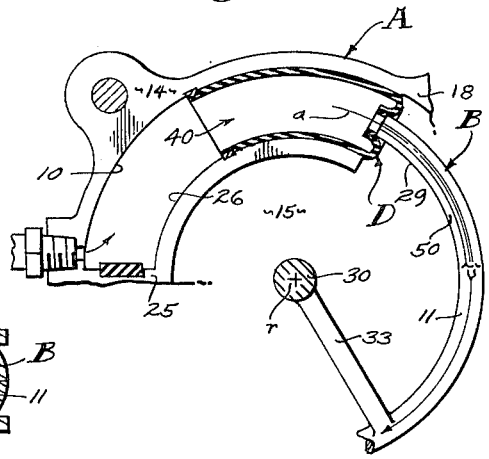
Figure 4:
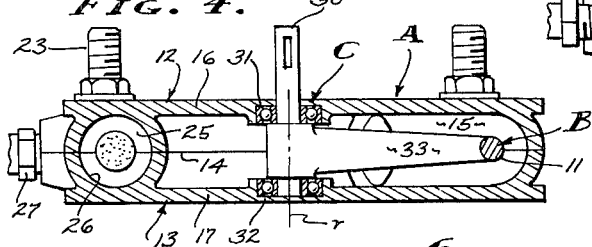
Figure 5:
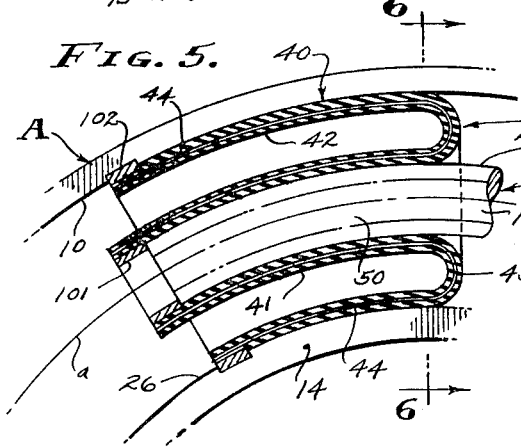
Figure 6:
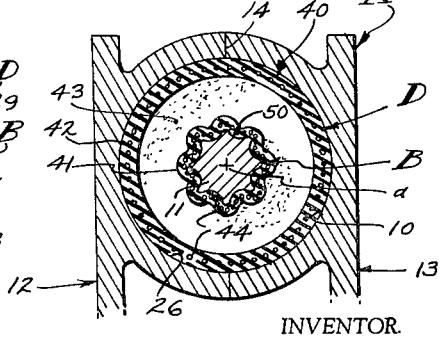

The various objects and features of this invention will be fully understood from the following detailed description of the typical form and application thereof, throughout which description reference is made to the accompanying drawings, in which:

In FIGS. 1 through 6 of the drawings there is shown a servo device, FIG. 1 being a sectional view taken through the central plane of the device, FIGS. 2 and 3 being fragmentary views of the structure shown in FIG. 1 and showing extreme alternate positions of the moving parts, FIG. 4 being a sectional view taken as indicated by line 4—4 on FIG. 1, FIG. 5 being an enlarged detailed section of a portion of the structure shown in FIG. 1, and FIG. 6 being a view taken as indicated by line 6—6 on FIG. 5. In FIG. 7 there is shown a transducer device, said view being similar to FIG. 1. In FIG. 8 there is shown an accelerometer device, said view being similar to FIG. 1 and/or FIG. 7. In FIG. 9 there is shown a modified cylinder wherein the pressure function varies.

In the drawings, the three specific forms of invention are shown, for use as a servo, for use as a transducer, and for use as an accelerometer, respectively. The three specific devices disclosed herein have features in common which make for a very practical device of the type under consideration, a device having to do with correlation of fluid pressure and of rotary motion. Essentially, the device hereinafter disclosed has one or more arcuate cylinders of segmental form and has a movable part operable along the arcuate axis $a$ of each cylinder, said movable part being rotatable on an axis $r$ at the radial center of the cylinder arc or axis $a$. Further, a unique seal is provided between the cylinder or cylinders and movable part whereby said part functions as a piston or ram.

In FIGS. 1–6 of the drawings I have shown a servo device that involves a cylinder body A in which the device is housed and supported, a ram B movable in the cylinder of body A to be driven or to drive, bearing means C to rotatably support the ram B in the body A, and a gland D to seal the ram B in the cylinder of body A and to permit free movement of said ram. The particular servo shown is double acting and has, therefore, a pair of opposed cylinders 10 that cooperate with opposite ends of an arcuate ram rod 11. In this instance, approximately 120° of rotation can be expected of ram B on the rotational axis $r$ while the said ram B operates within the cylinders 10 along the arcuate axis $a$ thereof.

The body A can be fabricated in various ways and is shown as a bi-part structure composed of two like half-shells 12 and 13 that separate at a central plane 14 coincidental with the cylinder axis $a$. The rotational axis $r$ extends through the body A normal to the plane 14 and through a chamber 15 established between upper and lower walls 16 and 17, and within side walls 18. Fastening holes 22 are provided at the corners of the four adjoining walls through which mounting studs 23 are secured to also hold the body parts together.

In accordance with the invention the body A has the cylinder 10 formed therein along a segmental arc or axis $a$, the radial center of which occurs at the rotational axis $r$. In the case illustrated where the device is double acting and there are two cylinders 10, the said cylinders can, in practice, extend through arcs of about 120° each. Thus, the chamber 15 extends through about 120°, there being a head 25 that divides the cylinders and which head occupies at least several degrees to thereby lessen the maximum movement of the ram B. There are several other factors, later described, which also lessen the maximum movement of the ram B. As is clearly shown, the cylinders are toroidal in form, normally of uniform cross-sectional diameter, closed at one end by a common head 25, and open at the other end into the chamber 15. The cylinder walls 26 are reasonably smooth, but not necessarily so smooth as is ordinarily required when sliding fits are involved. Further, fluid connections 27 are provided for introducing fluid into and for exhausting fluid from the two cylinders, said connections 27 being located at or in the head 25.

The ram B is a curved, or arcuate, element that extends from or between the cylinders 10 to be operated thereby, there being no pistons as such which would ordinarily be employed to actuate a ram. That is, the ram B per se is the piston part to be displaced by or to displace fluid. As shown, the ram B is formed to extend concentrically with the mean diameter or axis $a$ and is of an arcuate extent to include approximately 240°, the gland D being provided at the end or ends of the ram as will be described. The ram B does not slide over and does not frictionally engage any other part, and as is shown the end or ends 28 of the ram B have stopping engagement with snubbers at the head 25. The ram B is round, basically in cross-section and like the cylinder or cylinders 10 the ram is reasonably smooth, but not necessarily so smooth as is ordinarily required when sliding fits are involved. The central arcuate axis of the ram B remains incidental with the toroidal axis *a* at all times.

The bearing means C is provided so as to assure that the central arcuate axis of the ram B remains coincidental with the toroidal axis *a* at all times, and involves a pivotal support for the ram B. Said pivotal support comprises a shaft 30 rotatable on axis *r*, anti-friction bearings to carry the shaft in the body A, preferably spaced bearings 31 and 32, and a drive lever 33 joining the ram B to the shaft 30. The lever 33 projects radially from the shaft 30, in the central plane of the chamber 15 and this lever has lateral thickness which affects and lessens the travel of the ram, but slightly. The bearings 31 and 32 are shown as precision ball bearings seated in the upper and lower walls 16 and 17 of the body A.

In carrying out the invention the device to be driven, or the device which drives may be housed within the chamber 15, or as is the case illustrated the shaft 30 extends through an opening in the body A so as to project for driving engagement with the device (not shown) to which the servo is associated. It is to be understood that the wall 16 can be sealed where the shaft 30 projects from the body, in which case the chamber can be pressurized as circumstances require.

The gland D which characterizes this invention and which is provided to seal the ram B and cylinder 10 and also to permit free movement of the ram in its function as a piston, is a partially deformable part made of pliant material and shaped so as to permit the application of fluid pressure and to permit free relative movement between the ram B and cylinder 10. The gland D is semitoroidal in form as it extends along the axis *a*, being characterized by a deformable pliant wall 40 extending flexibly intermediate the outside diameter 29 of the ram B and inner diameter 26 of the cylinder 10. As shown, the gland D is, therefore, tubular and has an inner diameter portion 41 that is doubled back within an outer diameter portion 42, the said inner and outer portions being integrally joined by a curved portion 43. The two portions 41 and 42 are tubular and of substantial length with each open end thereof adapted to be tightly fastended to the inner ram B and the outer cylinder 10 respectively, as by rings adhered to the wall 40 and anchored in the ram and cylinder.

In accordance with the invention, the gland D is made of a material that is pliant so as to be flexible and a material that is not too elastic. Or, as is indicated, the gland D is made of extremely pliant material which is reinforced so as to be inelastic in one direction at least. Particularly, the gland D is reinforced by longitudinally extending cords 44 which permit bending but not stretching. Thus, the wall 40 can bend from the ram B to the cylinder 10, as it doubles back as illustrated. Further, the circumferential extent of the wall 40 can remain the same, or substantially the same, at both inner and outer portions 41 and 42 by the provision of the marcel crosssection shown clearly in the drawings. As shown, the inner portion is fitted onto a circumferential wave form 50 provided along the ram B and to the end that the pliant wall 40 folds onto and/or into said marcel wave form without changing its circumferential extent, (see FIG. 6). Thus, it is contemplated that circumferential cords (not shown) can be employed if so desired, as when higher fluid pressures are involved.

The transition of the wall 40 from portions 41 to 42 and through the curved portion 43 is semitoroidal, said toroidal formation thus formed being truncated in a plane normal to the axis *a*. Thus, the pliant wall 40 is turned and/or bent between different diameters, with the wall 40 bearing tangentially onto the ram B and onto the cylinder wall 29, all at said plane of truncation.

From the foregoing it will be clear that the ram B moves without sliding friction, and it is only the bearing means C and deflection of the pliant wall 40 that afford any frictional resistance. As to the bearing means C, the said means is loaded extremely lightly and thereby can be designed for minimal friction. As to the deflection of the pliant wall 40, the fluid pressure is applied from the open ends of the two inner and outer portions, and thereby the portion 43 is simply inflated and functions so as to roll without friction from its inner disposition to its outer disposition and naturally forms a semitoroid.

With the structure thus far described, and particularly with the seal or gland D, there is freedom of movement between the ram B and cylinder 10. In carrying out this invention the open ends of the tubular portions 41 and 42 are suitably secured to the parts that they engage, as by means of clamp rings 101 and 102. It is only the end extremity or margin which is clamped in each case, leaving a substantial length of wall 40 to be doubled over or back. Therefore, as rolling of the intermediate portion 43 occurs, a substantial distance of travel is provided for, as will be observed from the drawings.

In FIG. 7 of the drawings I have shown a transducer device that involves a cylinder body A' in which the device is housed and supported, a ram B' movable in the cylinder of the body A' to be driven mechanically, bearing means C' to rotatably support the ram B' in the body A', and a gland D' to seal the ram B' in the cylinder A' and to permit free movement of the said ram in said cylinder. A double acting transducer is shown and which is capable of detecting torque as applied oppositely and has, therefore, a pair of opposed cylinders 10' that cooperate with opposite ends of or with arcuate ram rods 11'. In this instance rotation is limited, in which case the cylinder lengths are minimized and the active ends of the ram B' are shortened. As is shown, a pair of diametrically opposite ram rods 11' are connected by a beam 33' that is supported by a shaft 30', all other features remaining essentially the same as described above regarding the first form of the invention. However, in this second form the heads 25' are also separated and each head incorporates therein a suitable fluid pressure sensing device, as is common to a transducer, preferably a device which develops or controls an electrical current, as is indicated.

In FIG. 8 of the drawings I have shown an accelerometer device that involves a cylinder body A'' in which the device is housed and supported, a ram B'' movable in the cylinder of body A'' to be driven inertially, bearing means C'' to rotatably support the ram B'' in the body A'', and a gland D'' to seal the ram B'' in the cylinder 10'' and to permit free movement of said ram in said cylinder. A double acting accelerometer is shown and which is capable of detecting rotational acceleration as applied positively and has, therefore, a pair of opposed cylinders 10'' that cooperate with opposite ends of an arcuate ram rod. In this instance rotation is to be freely sensed and suitable inertia of the movable ram B'' is established by additional weight 33'' as necessary, all features remaining essentially the same as described in the first and second forms of the invention. However, in this third form the connections 27'' at the heads 25'' are used for pressure biasing of the cylinder chambers, preferably with an inert gas supplied from independent pressure regulated sources, as shown for example, and the ram B'' is magnetic and surrounded by one or more electrical induction windings 100. The fluid pressure bias is regulated, as indicated.

As shown, in the third form of the invention, there is a winding 100 at the open end of each cylinder 10'' whereby the induction in said windings varies directly or inversely depending upon the position of the lever weight 33''. As is shown, the ram B'' has mass and the center of which occurs at the center of attachment to the weight 33'', and likewise the weight 33'' has mass the center of which is determined by its geometry. Therefore, upon movement of the mass center (or combined centers) the proximity thereof to the respective windings 100 has a varying effect that changes the electrical induction, similar to the variable insertion of magnetic material into a winding. Although the signal is expected to be small with the structure herein disclosed, nevertheless a detection of mass position is obtained by comparison of the induction at the two windings 100, for instance as is the case when a highly sensitive flux-gate is positioned relative to a magnetic mass. Thus, the electrical signal from the windings 100 is directly dependent upon placement of the ram B'', it being apparent that the electrical signal or signals can be utilized in various ways as circumstances require. It will be apparent to those skilled in the art that the weight 33'' can have influence or effect on the magnetic field, if it were to be made of magnetic material. However, it will be equally apparent that the weight will have no influence or effect on the magnetic field, providing it is made of a non magnetic material.

With the rotary fluid displacement device as hereinabove disclosed a precise and direct correlation is obtained between rotary motion and fluid pressure or displacement. The said rotary motion is substantially frictionless and the fluid pressure or displacement is direct and positive. Thus, the said device is particularly useful for those purposes disclosed.

In FIG. 9 of the drawings I have shown a modified cylinder wherein the function of pressure varies depending upon longitudinal displacement of the ram or piston. It is to be understood that such a ram can be arcuate as shown in the form previously described, or it can be a straight ram BB in which case the cylinder body AA is also straight. That is, the piston part and the cylinder can be straight. However, in accordance with this form of the invention the cylinder is tapered so that the inner bore thereof is conical, as shown. The taper can be made to widen in either direction longitudinal of the reciprocating axis of the ram BB. It will be apparent that the effective cross sectional area of the unit is thereby varied dependent upon the longitudinal position of the ram BB to the cylinder body AA.

Having described typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. A rotary fluid displacement accelerometer comprising:
    (a) a body having a fluid handling cylinder in the form of a toroidal segment, said segment being curved about a rotational axis,
    (b) an arcuate ram curved coincidently with the cylinder and adapted to enter the cylinder,
    (c) bearing means rotatably supporting the ram from the body and on said rotational axis,
    (d) and a seal at the open end of the cylinder and comprising a wall of pliant material having a tubular portion fixed to the ram surrounded by a tubular portion fixed to the cylinder and with an integral intermediate portion extending therebetween,
    (e) and an induction winding surrounding the ram to detect the positioning thereof.

2. A rotary fluid displacement accelerometer comprising:
    (a) a body having a fluid handling cylinder in the form of a toroidal segment, said segment being curved about a rotational axis,
    (b) an arcuate ram curved coincidently with the cylinder and adapted to enter the cylinder,
    (c) bearing means rotatably supporting the ram from the body and on said rotational axis,
    (d) and a seal at the open end of the cylinder and comprising a wall of pliant material having a tubular portion fixed to the ram surrounded by a tubular portion fixed to the cylinder and with an integral intermediate portion extending therebetween,
    (e) an induction winding surrounding the ram to detect the positioning thereof,
    (f) and means to apply fluid under pressure to the closed end of the cylinder to bias the ram.

References Cited by the Examiner

UNITED STATES PATENTS

| | | | |
|---|---|---|---|
| 799,531 | 9/1905 | Bryant | 92—5 |
| 952,070 | 3/1910 | Cota | 91—1 |
| 1,987,651 | 1/1935 | Wiegand | 92—5 |
| 2,178,953 | 11/1939 | Chilton | 92—99 |
| 2,753,850 | 7/1956 | Baumgartner | 92—120 |
| 3,043,338 | 7/1962 | Hanson | 92—99 |
| 3,051,143 | 8/1962 | Nee | 92—98 |
| 3,063,426 | 11/1962 | Schmitt | 91—363 |
| 3,070,071 | 12/1962 | Cooper | 91—363 |

FOREIGN PATENTS 1,028,644  2/1953  France.

SAMUEL LEVINE, *Primary Examiner.*

RICHARD B. WILKINSON, *Examiner.*